June 2, 1936.  E. C. HORTON ET AL  2,042,897
WINDSHIELD CLEANER
Original Filed March 20, 1930  2 Sheets-Sheet 1
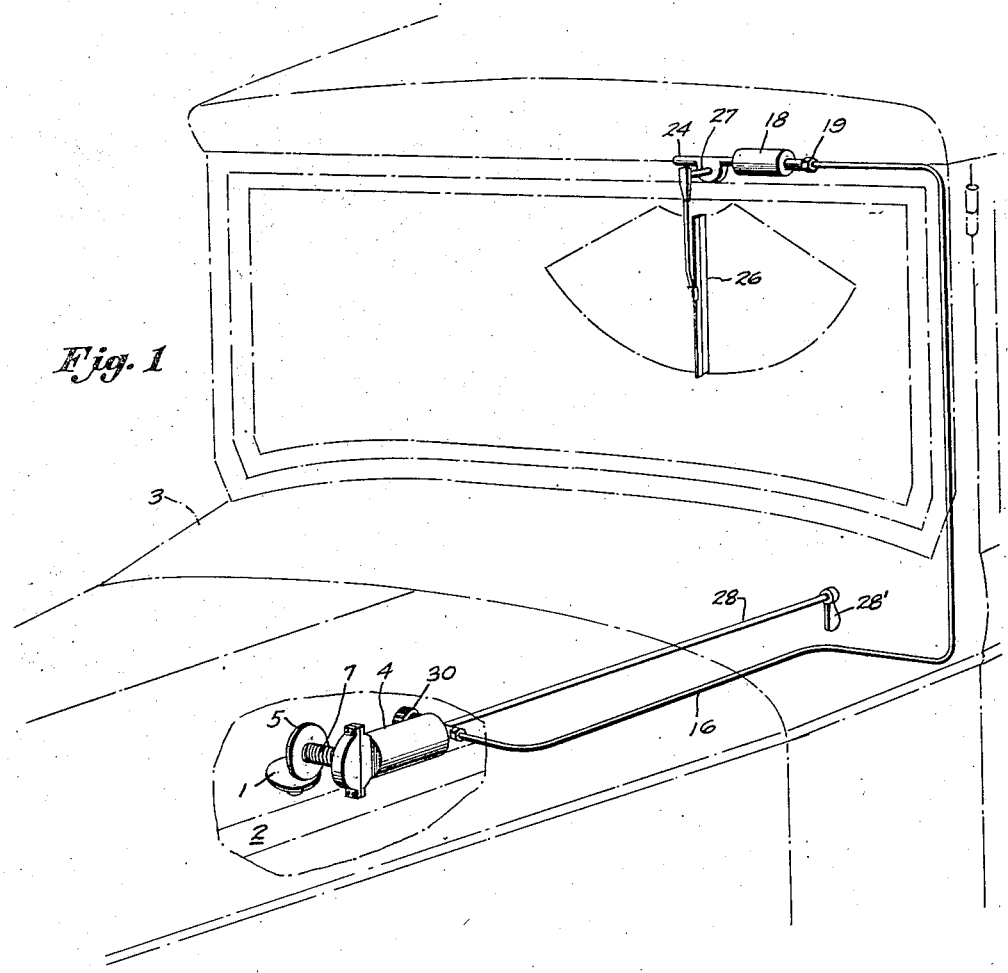
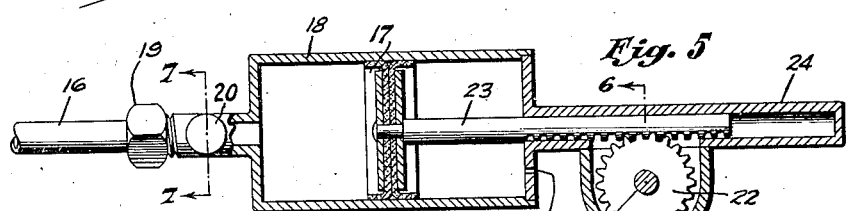
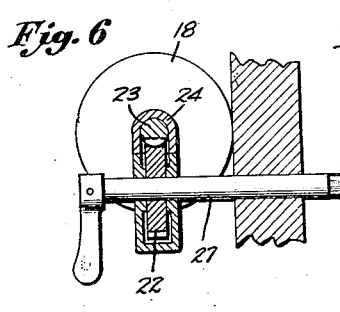
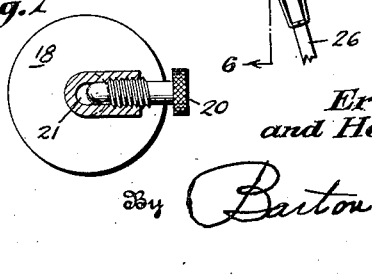
Inventors
*Erwin C. Horton
and Henry Hueber*
By Barton A. Bean Jr.
Attorney June 2, 1936.  E. C. HORTON ET AL  2,042,897
WINDSHIELD CLEANER
Original Filed March 20, 1930   2 Sheets-Sheet 2
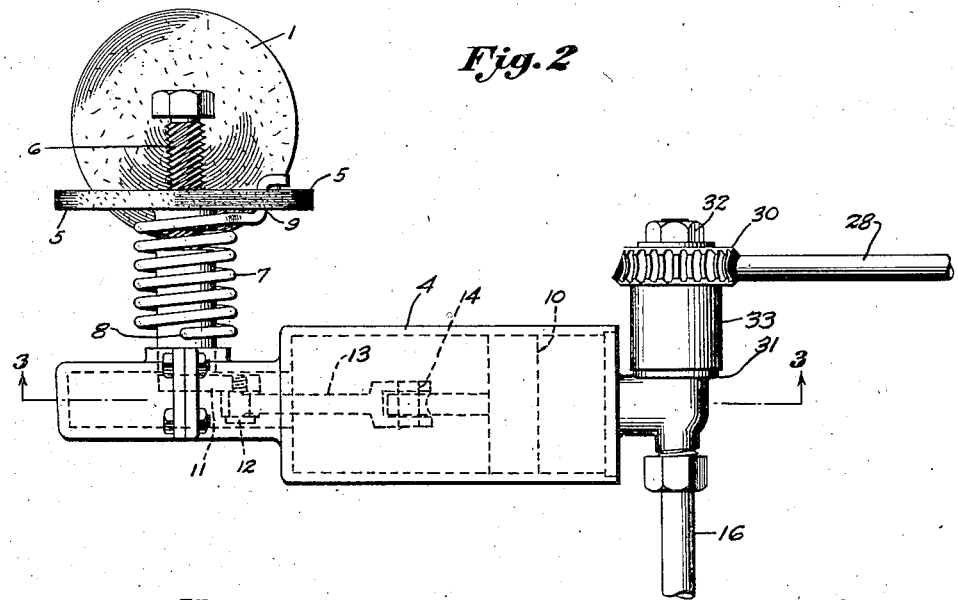
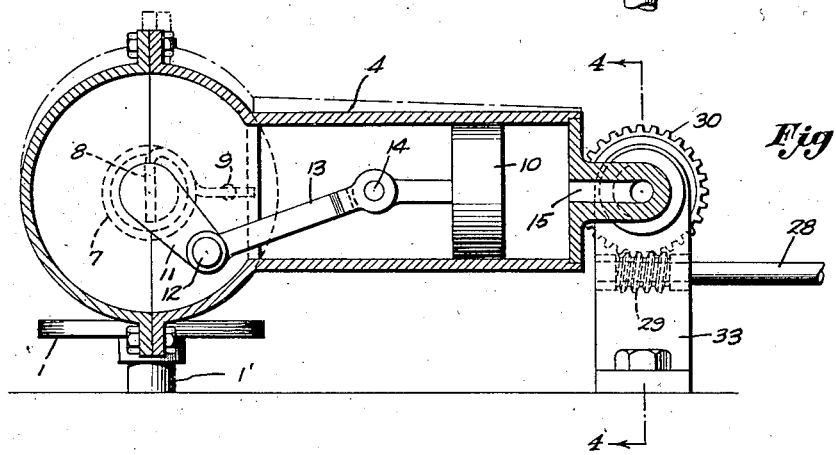
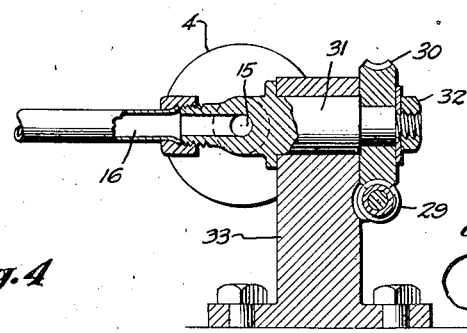
Inventors
Erwin C. Horton
and Henry Hueber
Barton A. Beau
By        Attorney Patented June 2, 1936

2,042,897

UNITED STATES PATENT OFFICE 2,042,897

WINDSHIELD CLEANER

Erwin C. Horton, Hamburg, and Henry Hueber, Buffalo, N. Y., assignors to Trico Products Corporation, Buffalo, N. Y.

Application March 20, 1930, Serial No. 437,578
Renewed July 19, 1932

18 Claims. (Cl. 15—255)

This invention relates to a windshield cleaner for motor vehicles and it has for its primary object to provide a cleaner system which derives its power from a variable speed source and applies it to the windshield wiper at a more constant speed through a compensating transmission, the entire system acting automatically in its functioning, whereby the cleaner movement is more or less constant under predetermined varying speeds at the source.

In the operation of automobile accessories, such as windshield wipers, it has been found desirable to use motive power other than that obtained from the storage battery of the automobile and the use of fluid pressure has been found very advantageous. Such fluid pressure has been obtained heretofore from the intake manifold of the engine of the automobile. The magnitude of such pressure however fluctuates depending upon the operating conditions of the automobile engine and the operation of the accessory varies, of necessity, with the fluctuations of the fluid pressure. Boosting devices have been provided as additional means for augmenting the fluid pressure from the intake manifold and to insure a constant source of fluid pressure, not however with complete success.

The present invention is designed to provide a mechanism whereby a constant source of power is obtained from a direct drive of the engine shaft or other moving part of the vehicle; to provide for the transmission of a substantially constant driving speed from a source of variable speed; to provide a pressure-vacuum mechanism for actuating automobile accessories such as windshield wipers.

In the drawings:

Fig. 1 shows portions of an automobile in phantom with the pumping and driving mechanism attached.

Fig. 2 is a top view showing friction gears and pumping mechanism.

Fig. 3 is a view on line 3—3 of Fig. 2.

Fig. 4 is a view on line 4—4 of Fig. 3.

Fig. 5 is a sectional view of the windshield cleaner driving mechanism.

Fig. 6 is a view on line 6—6 of Fig. 5.

Fig. 7 is a view on line 7—7 of Fig. 5.

Referring more specifically to the drawings where like numerals indicate like parts throughout the several views; a drive wheel 1 is driven through a direct driving shaft by the engine 2 of the automobile 3. Since the speed of rotation of this gear is constantly changing with the rate of revolution of the engine and since it is desirable to obtain a constant driving speed for the pump 4, a variable gear mechanism is provided. To this end, a second gear 5 is placed in driving engagement with the gear 1, such as by having the periphery of gear 5 contacting with the driving surface of gear 1. The drive preferably is of the friction type.

In the usual operation of gears of the friction type the gear wheel receiving the impulsive force is urged outwardly toward the periphery of the driving wheel in response to an increase in the peripheral speed of this wheel. In the operation of windshield wipers a constant driving speed is desired and this is obtained by mounting the impulse receiving wheel upon a threaded portion of a shaft 6, the said threaded portion being provided with multiple threads having a pitch which will allow the wheel 5 to move the more readily inwardly and outwardly with respect to the center of wheel 1. The desired relation between the friction wheels 1 and 5 is obtained by means of the coil spring 7 which is anchored in the shaft, which is within said spring, at one end 8 and which is attached to wheel 5 at its other end. A simple attachment is made by passing the end of the spring through a hole 9 in the wheel and bending the free end of the spring in angular relation to that portion projecting through the wheel. Thus, there is provided a compensating drive in which the driven wheel tends to maintain a uniform peripheral speed. This compensating friction gear, consisting of elements 1, 5, 6 and 7, insures a substantially constant driving speed; thus when the wheel 1 rotates, for instance in a clockwise direction, motion transmitted to the friction wheel 5 causes that wheel to advance axially and outwardly upon the threaded shaft elongating the spring 7 and subjecting it to torsion. A rapid rotation of the wheel 1 therefore instead of increasing in like manner the speed of wheel 5 causes an adjustment of the geared relation so that a practically constant speed of rotation is transmitted by the shaft 6 to the crank 11 attached to the end of said shaft.

The rotatory motion of the shaft 6 is transmitted to a pumping mechanism, such as a reciprocating piston 10 contained within the cylinder 4, by means of the crank 11 attached to the shaft 6. Said crank is attached by means of a crank pin 12 to the link 13 which forms propulsive engagement with the pumping means 10 through the connecting pin 14.

On the propulsion or compression stroke of the piston 10 the fluid pressure in the outlet 15 attached adjacent the cylinder head is increased and such pressure is transmitted through the conduit 16 to responsive driving means for actuating the particular automobile accessory.

A preferable form of windshield cleaner driving mechanism consists of a piston 17 within a cylinder 18 which is removably attached to the flexible conduit 16, by well known means such as the connecting collar nut 19. The degree of activity of the piston 17 is controlled by regulating the amount of fluid pressure entering the cylinder 18, as by a valving mechanism consisting of a set screw 20 threaded into the passage 21 leading into the cylinder 18, and adapted to seat or unseat therein by suitable manipulation of the screw 20.

When the valve mechanism operated by the set screw 20 is open fluid pressure generated by piston 10 flows through the conduit 16 into the cylinder 18 and actuates the piston 17 therein. When the fluid pressure is greater than atmospheric pressure the piston is propelled outwardly from the passage 21 and its movement transmitted to a wiper. In the present showing the wiper movement is oscillatory as provided by a rotatable gear wheel or pinion 22 meshing with a rack on the piston rod 23 which extends into a housing 24. The fluid pressure upon the side of the piston away from the connecting conduit 16 is kept substantially the same as that of the atmosphere by means of the breather hole 25, which permits of free ingress and egress of atmospheric air.

On the suction stroke of the piston 10 the fluid pressure in the connecting conduit 16 and that part of the cylinder 4 connected therewith, is attenuated and becomes substantially less than atmospheric whereby fluid pressure of the atmosphere causes air to enter the breather hole 25 and force the piston 17 toward the entering passage 21 until sufficient pressure is built up in the system to reverse the cycle.

The consequent reciprocating movement of the rack 23, transmitted through the pinion 22 will actuate the windshield wiper 26 which is attached to a shaft 27 extending through the header of the automobile and to which the gear 22 is attached.

At those times when it is not desired to use the fluid pressure generated by the pumping mechanism 4, the contact between the friction wheels 1 and 5 is broken by turning a handle 28', located at some convenient point adjacent the operator such as the dash board. The said handle is connected to the rod 28 extending from the dash board and said rod terminates in a worm 29 engaging with a gear wheel 30 which is attached to a portion of the cylinder 4 or to some extension thereof such as the shaft 31. The said shaft carries the gear wheel 30 keyed thereon and retained by the nut 32. The flexibility of the conduit permits a pivoting movement about the axis of the shaft 31 which is supported by a bracket 33 which is bolted or secured by other means to a convenient portion of the automobile.

In the operating of the device, engaging contact may be made between the gear wheels 1 and 5 by manual operation of the handle 28' pivoting the cylinder 4 about the shaft 31. Contact of the friction wheel 5 with the directly driven wheel 1 causes a rotation of said wheel 5.

The said wheel being threadedly mounted upon the threaded shaft 6 is free to rotate thereon with respect to the rotation of the shaft and is capable of moving longitudinally thereof. These movements are circumscribed however by the coil spring 7 which is attached by one end to the shaft 6 and by the other end to the wheel 5. This attachment is provided for regulating the speed of operation of the connected pump mechanism; as the speed of rotation of wheel 1 is increased beyond a certain point, wheel 5, turning upon the said threaded shaft 6, moves outwardly upon the said shaft toward the center of wheel 1, being hindered however in its outward movement by the spring. The contact of the periphery of wheel 5 having moved toward the center of wheel 1 the rate of peripheral speed of wheel 5 will not increase but will remain substantially constant. At such times as there is a decrease in the rate of rotational speed of wheel 1 the tension of the spring 7 allows for the differential rotary motion of the shaft 6 and wheel 5 to occur; the wheel 5 slowing down and being acted upon by the spring 7 so as to rotate, in effect, at a slower rate than the threaded shaft. Therefore, a reversed screwing action occurs with respect to the shaft and the wheel, and the said wheel 5 moves toward the periphery of the wheel 1 or inwardly upon the shaft. Thus, the point of contact with the wheel 1 moves outwardly with respect to the driving wheel whereby a substantially constant rate of rotation for the said wheel 5 is maintained.

Rotation of the shaft 6 actuates the pumping mechanism 4 whereby variation in the fluid pressure in the conduit 16 is produced. In other words, the column of air in the conduit 16 is reciprocated and used as motive power on the driving mechanism attached to the windshield wiper 26.

From the foregoing it will be observed that as the drive shaft 1' increases its speed, the transmission function of the compensating gearing will tend to reciprocate the pump piston 10 at a faster speed and thereby cause faster reciprocation of the connecting air column or link through the outlet 15 and the conduit 16. An increase in the speed of driven wheel or gear 5 will result not only in an increase in the speed of operation of piston 10, but also an increase in the rate of reciprocation of the air column in passage 16 and an increase in the rate of reciprocation of piston 17, rod 23, and the wiper parts 22, 26. The acceleration of these parts will, of course, produce an increased torque in the driven wheel 5. Further, since the movement of parts 17, 23, 22 and 26 is reversed at the completion of each stroke, an increased speed of operation of these parts necessitates a frequently recurring acceleration of them to the higher speeds, necessitating an increased driving torque during the entire period of higher speed operation. Furthermore, an increase in the speed of operation of the piston 10 will effect a pressure increase in the connecting air link and result in an increase in the air friction. This will result in an increase in the torque applied to the driven gear 5 since the friction of the air, in passing through the conduit 16, increases at a greater proportion than a direct ratio with its back and forth movement.

For all of the foregoing reasons, such variance in the speed will necessitate a variance in the toque to cause said gear 5 to advance along the spiral thread 6 of its supporting shaft and thus reduce the driving speed ratio between the gears 1 and 5 to compensate for the increase in the speed of driving gear 1. This compensating action in the transmission will tend to maintain the reciprocatory movement of the piston 10 and the wiper 26 more nearly constant. By utilizing the inherent inertia of the driven parts and the air friction as a torque regulating detail the variation in the driving torque required to produce a certain increase in speed is greater than that which would follow as a direct proportionate with the speed. Therefore while the increase in torque determines the ratio changing function of the compensating gearing, such increase is due to the increase in the speed of operation. An upward variation in speed is reflected in an increase in torque, and therefore the compensating action of the gearing responds to speed variations in the driving gear 1.

The passage restriction for the connecting air column is varied by the valve 20, and consequently the capacity of the conduit 16 is likewise adjusted. Thus, if the valve 20 is fully opened so that the full capacity of the conduit 16 is available, the reciprocating air column in such conduit will be comparatively free and the torque on the shaft 6 will be relatively light so that the speed of the driven shaft, at which the compensating gearing is responsive, will be higher than when the valve 20 is partly closed. A partial closing of the valve will restrict the capacity of the conduit 16 and thereby reduce the freedom of movement of the air column. This results in an increase in the air friction, in the load, and in the torque on the driven shaft, sufficient to advance the driven gear 5 inwardly on the driving face of gear 1. A resultant change in the driving speed ratio between the gears 1 and 5 therefore takes place. By this provision the motorist is enabled to predetermine and adjust the maximum speed for the cleaner movement.

What is claimed is:

1. The combination with an automotive vehicle having an engine and a windshield cleaner driven by fluid pressure, of means for periodically varying fluid pressure, a conduit leading from said means to said cleaner, a direct drive shaft from said engine having a variable speed, and speed compensating means cooperating with said drive shaft for compensating said variable speed to actuate said fluid pressure varying means at a substantially constant rate.

2. The combination with an automotive vehicle having an engine and a windshield cleaner, of a direct drive shaft from said engine having a variable speed, a speed compensating gearing having cooperative engagement with said direct drive shaft for compensating said variable speed, means continuously driven by said gearing for supplying said cleaner with operating power, and manual means for breaking said engagement.

3. The combination with an automotive vehicle having a windshield cleaner driven by fluid pressure, of a drive member operating at a variable speed, a compensating gear comprising a threaded shaft, a friction gear wheel engaging said drive member and threaded upon said threaded shaft for movement toward or from the axis of said drive member when rotated on said threaded shaft, a coil spring attached to said wheel and encompassing said shaft and attached thereto, and a reciprocating pump connected to and actuated by said threaded shaft and having fluid communication with the cleaner for supplying fluid pressure to said cleaner for driving the same.

4. The combination with an automotive vehicle having a variable speed drive and a windshield cleaner driven by fluid pressure, of a pressure-vacuum pumping system comprising a cylinder having an outlet at one end, a piston in said cylinder, a speed compensating gearing means operatively connected to and driven by said variable speed drive for actuating said piston at a relatively constant rate, and a conduit having fluid communication with said cleaner and said cylinder outlet.

5. The combination with an automotive vehicle having an engine driven variable speed shaft and a windshield cleaner driven by fluid pressure, of a pressure-vacuum pumping system in fluid communication with said cleaner, speed compensating means for driving said system from said variable speed shaft at a relatively constant rate, and means for disengaging said system from said variable speed shaft.

6. The combination with an automotive vehicle having an engine and a windshield cleaner driven by fluid pressure, a pressure-vacuum pumping system in fluid communication with said cleaner, a compensating friction gear for driving said system comprising a rotatable driving disc, a driven disc having impulsive contact with said driving disc, a rotatable threaded shaft supporting said driven disc and upon which the said disc will tend to advance toward the axis of said driving disc when driven, a coil spring surrounding said shaft and being attached at one end to the shaft and having the other end attached to the driven disc, said spring acting as a torsional drive preventing the complete unscrewing of the driven wheel, and a pumping mechanism in said system actuated by said driven disc whereby said cleaner is rendered operable.

7. The combination with an automotive vehicle having a variable speed drive member, and a windshield cleaner driven by fluid pressure, of pumping means, a speed compensating transmission connecting the pumping means to said drive member for being driven thereby at a substantially constant rate, a conduit in fluid communication with said pumping means and said cleaner, and compressible fluid contained in said conduit which is alternately compressed and attenuated in response to said pumping means.

8. The combination with an automotive vehicle having a variable speed drive member, and a windshield cleaner driven by fluid pressure, of speed compensating transmission gearing having cooperative engagement with said drive member for compensating said variable speed, pumping means driven by said gearing, a conduit in fluid communication with said pumping means and said cleaner and a pressure responsive fluid contained in said pumping means, conduit and cleaner, said compensating transmission gearing operating said pumping means at a substantially constant rate.

9. The combination with a motor vehicle having a variable speed rotating shaft and a windshield cleaner mounted for back and forth movement, a driving rotative means operatively connected to the shaft, a driven rotative means operated by said driving rotative means, motion translating and transmitting means connecting the driven rotative means to said windshield cleaner and requiring a greater driving torque to operate at a certain speed than that required for operation at a lesser speed, means mounting one of said rotative means for adjustment relative to the companion rotative means to vary the speed transmission ratio therebetween, and torque responsive means responsive to the torque in the adjustably mounted one of said rotative means for effecting such adjustment of said rotative means to maintain a relatively constant speed of rotation of the driven rotative means in the presence of predetermined varying speeds of rotation of the driving rotative means, whereby the cleaner movement will remain substantially constant.

10. In combination, an automotive vehicle having a variable speed shaft, a windshield wiper movable back and forth on a windshield, and transmission means between the wiper and the shaft for operating the wiper, said transmission means including means responsive to speed for varying the driving ratio between the shaft and the wiper to substantially maintain the wiper against exceeding a predetermined speed of operation, and manually operated control means for varying such predetermined speed of wiper operation.

11. In combination, an automotive vehicle having a variable speed shaft, a windshield cleaner operable on the vehicle windshield, speed compensating gearing for cooperative engagement with said shaft and comprising a drive element and a driven element with means automatically responsive to a predetermined variation in the speed of said driven element to maintain the movement of the cleaner substantially constant during predetermined variations in the speed of said drive element, means operated by said driven element for transmitting power to said windshield cleaner, and means for disconnecting the driven element from the driving element to arrest the cleaner.

12. In combination, an automotive vehicle having a variable speed engine driven shaft, a fluid pressure operated windshield cleaner, means operable from the shaft for providing fluid pressure to operate said fluid pressure operated windshield cleaner, and power transmission means interposed between said first means and said shaft for operating said first means from said shaft to maintain a substantially constant operation of the fluid pressure operated windshield cleaner during variations in the speed of said shaft, said transmission means embodying a shaft operated member operatively connected to said shaft and a driven member driven from said shaft operated member and movable relative thereto to vary the ratio of movement between said shaft operated member and said driven member, and resilient means urging said driven member into a maximum drive relationship to said shaft operated member to maintain normal cleaner operation.

13. The combination set forth in claim 12, wherein manually operated control means are provided for varying such normal cleaner operation.

14. In combination, an automotive vehicle having a variable speed shaft, a windshield cleaner operating mechanism, transmission means connecting the shaft to the cleaner operating mechanism, the resistance of said cleaner operating mechanism to movement constituting a load increasing with the speed of cleaner operation, said transmission means including speed changing mechanism for maintaining a substantially constant cleaner movement during predetermined speed variations in the shaft, load responsive means for operating said speed changing mechanism, and manually adjustable means for determining the speed of the cleaner at which said load responsive means will function.

15. In combination, an automotive vehicle having a variable speed shaft, a windshield cleaner, transmission mechanism connecting the shaft to the cleaner and operable to maintain a predetermined cleaner movement during predetermined speed variations in the shaft, said transmission mechanism including means offering increased resistance in accordance with increased speed of operation and means responsive to such increased resistance for controlling said transmission mechanism to maintain such predetermined cleaner movement, and manual means for varying such offered resistance to adjust such predetermined cleaner movement.

16. In combination with a rotatable part of a motor vehicle constituting a rotary drive, a windshield wiper, transmission means connecting the drive to the wiper, said transmission means including speed responsive means operable to vary the driving relation between the drive and wiper for maintaining a predetermined maximum wiper movement, and manual control means for adjusting the responsiveness of said speed responsive means to selective speeds whereby the predetermined maximum wiper movement may be adjustably set by the operator of the motor vehicle.

17. A windshield cleaner having a wiper, a rotary drive therefor, transmission means operatively connecting the drive to the wiper for reciprocating the latter and including means responsive to speed variations therein for automatically changing the driving relation between the drive and the wiper to maintain the wipe operation against exceeding a predetermined speed, and manually operated control means for variably selecting the speed of wiper operation to be maintained.

18. In combination with a motor vehicle power plant having a variable speed engine driven shaft, a windshield cleaner having a wiper, a driven shaft for actuating the wiper on the windshield surface, transmission means operatively connecting the variable speed shaft to the driven shaft and including speed responsive means operable to maintain the driven shaft speed substantially constant in the presence of a relatively faster speed of the variable speed shaft, and means manually operable from the driver's seat for adjusting the sensitiveness of the speed responsive means to vary such substantially constant speed of the driven shaft.

ERWIN C. HORTON.
HENRY HUEBER.